United States Patent
Wilson et al.

(10) Patent No.: US 7,458,332 B2
(45) Date of Patent: Dec. 2, 2008

(54) HIGH SPEED MARINE VESSEL

(76) Inventors: Jim Wilson, 810 Pembroke, White Lake, MI (US) 48326; Scott Snow, 3600 Shirley St., Commerce, MI (US) 48390

( * ) Notice: Subject to any disclaimer, the term of this patent is extended or adjusted under 35 U.S.C. 154(b) by 0 days.

(21) Appl. No.: 11/459,445

(22) Filed: Jul. 24, 2006

(65) Prior Publication Data

US 2007/0039539 A1  Feb. 22, 2007

Related U.S. Application Data

(60) Provisional application No. 60/701,776, filed on Jul. 22, 2005.

(51) Int. Cl.
*B63B 1/32* (2006.01)
(52) U.S. Cl. ..................... 114/288; 114/67 A
(58) Field of Classification Search ................ 114/271, 114/283, 288, 289, 290, 291, 292, 67 A
See application file for complete search history.

(56) References Cited

U.S. PATENT DOCUMENTS

| | | | | |
|---|---|---|---|---|
| 1,754,149 A | * | 4/1930 | Cummins | .................... 114/271 |
| 2,370,318 A | * | 2/1945 | Lake | ........................... 114/283 |
| 3,191,572 A | * | 6/1965 | Wilson | ........................ 114/289 |
| 3,424,120 A | * | 1/1969 | Koriagin | ..................... 114/280 |
| 3,702,598 A | * | 11/1972 | Szptyman | .................... 114/289 |
| 3,937,164 A | * | 2/1976 | Austin | ......................... 114/288 |
| 3,968,763 A | | 7/1976 | Mason | |
| 4,029,036 A | * | 6/1977 | Magnuson | ................ 114/67 A |
| 4,924,792 A | | 5/1990 | Sapp et al. | |
| 4,944,240 A | * | 7/1990 | Morris | ........................ 114/283 |
| 4,993,349 A | | 2/1991 | Solari | |
| 5,176,095 A | | 1/1993 | Burg | |
| 5,787,829 A | * | 8/1998 | Oshima | ..................... 114/67 A |
| 5,988,097 A | * | 11/1999 | Karney et al. | ................ 114/283 |
| 6,526,903 B2 | | 3/2003 | Robinson | |
| 7,039,512 B2 | * | 5/2006 | Swinbanks et al. | ............ 701/37 |
| 2004/0024503 A1 | | 2/2004 | Swinbanks et al. | |

* cited by examiner

*Primary Examiner*—Lars A Olson
(74) *Attorney, Agent, or Firm*—Gifford, Krass, Sprinkle, Anderson, & Citkowski, P.C.

(57) ABSTRACT

A high-speed boat includes a hull having multiple sponsons. At least one propulsion unit is disposed on the hull. The propulsion unit is moveable with respect to the boat hull adjusting a thrust vector of the propulsion unit. In another aspect, the high-speed boat may include a hull having fore and aft portions. The fore portion includes multiple sponsons. At least one moveable step is attached to one of the sponsons, dynamically adjusting that sponson's relative contact position with respect to a water surface. In another aspect, the high-speed boat may include a hull having multiple sponsons separated by a forward hull portion. The forward hull portion includes a top surface and a bottom surface. At least one adjustable dump vent is formed on the bottom surface of the forward hull portion. The dump vent includes a door moveable with respect to the dump vent for controlling a volume of air released through the dump vent. The dump vent extends from the bottom surface to the top surface of the forward hull portion. In another aspect, the high-speed boat may include a hull including a pair of sponsons separated by a forward hull portion. The forward hull portion includes a top surface and bottom surface. At least one static vent is formed on the bottom surface of the forward hull portion. The static vent extends from the bottom surface to the top surface of the forward hull portion. In another aspect, the high-speed boat 20 may be integrated with a dynamic vessel control system.

9 Claims, 7 Drawing Sheets

HIGH SPEED MARINE VESSEL

RELATED APPLICATIONS

This application claims priority of U.S. Patent Provisional Application No. 60/701,776 filed Jul. 22, 2005 which is incorporated herein by reference.

FIELD OF THE INVENTION

The invention relates to high-speed marine vessels.

BACKGROUND OF THE INVENTION

High-speed marine vessels that plane on a water surface or hydroplanes are generally known in the art. Hydroplanes typically ride at high speeds upon an air cushion formed between the hull bottom and a surface of the water. Hydroplane hulls generally include an air tunnel between a pair of spaced apart sponsons. Air flows in a tunnel formed between the two sponsons and a high pressure develops in the tunnel forcing the undersurface of the hull out of the water.

Hydroplaning hulls are known to be fast and maneuverable, however must be carefully controlled in confused seas or certain types of wave patterns. If the lift on the forward portion of the hull becomes too great the hydroplane may destabilize and exceed safe operational attitude limits, Accordingly, there is a need in the art for a high-speed vessel that has an improved performance and stability and has the ability to operate in various water conditions.

SUMMARY OF THE INVENTION

A high-speed boat includes a hull having multiple sponsons. At least one propulsion unit is disposed on the hull. The propulsion unit is moveable with respect to the boat hull for thrust vector manipulation. The propulsion unit is capable of dynamically adjusting its thrust vector vertically, horizontally, or both vertically and horizontally with respect to the boat hull.

In another aspect, the high-speed boat may include a hull having fore and aft portions. The fore portion includes multiple sponsons. At least one moveable step is attached to one of the sponsons, dynamically adjusting that sponson's relative contact position with respect to a water surface.

In another aspect, the high-speed boat may include a hull having multiple sponsons separated by a forward hull portion. The forward hull portion includes a top surface and a bottom surface. At least one dynamically adjustable dump vent is formed on the bottom surface of the forward hull portion. The dump vent includes a door moveable with respect to the dump vent for controlling a volume of air released through the dump vent. The dump vent extends from the bottom surface to the top surface of the forward hull portion.

In another aspect, the high-speed boat may include a hull having multiple sponsons separated by a forward hull portion. The forward hull portion includes a top surface and a bottom surface. At least one static vent is formed on the bottom surface of the forward hull portion. The static vent extends from the bottom surface to the top surface of the forward hull portion.

DETAILED DESCRIPTION OF THE PREFERRED EMBODIMENTS

Figure 1:
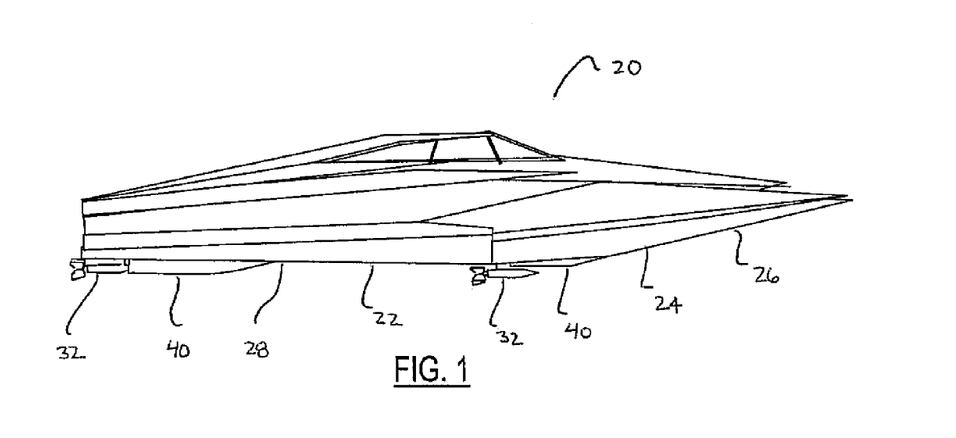
FIG. 1 is a side view of a high-speed boat hull with the steps in one position.
Figure 2:
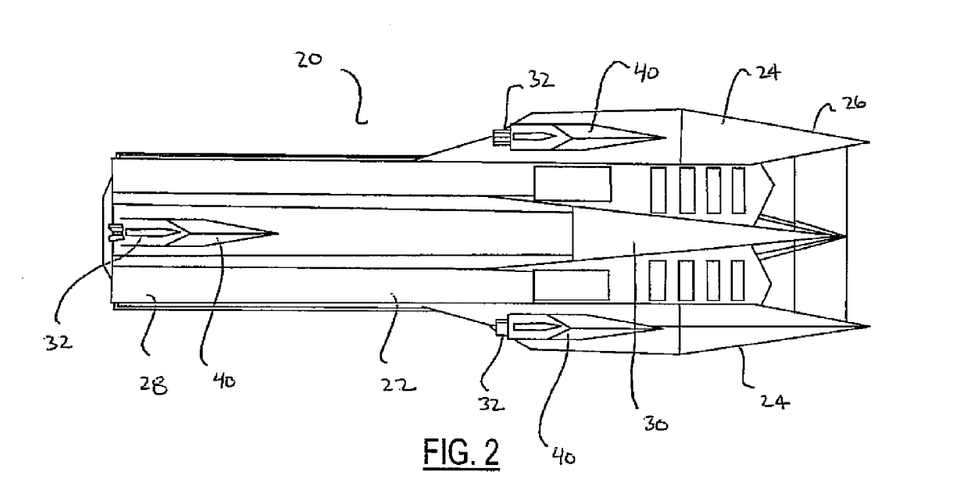
FIG. 2 is a bottom view of a high-speed boat hull.
Figure 3:
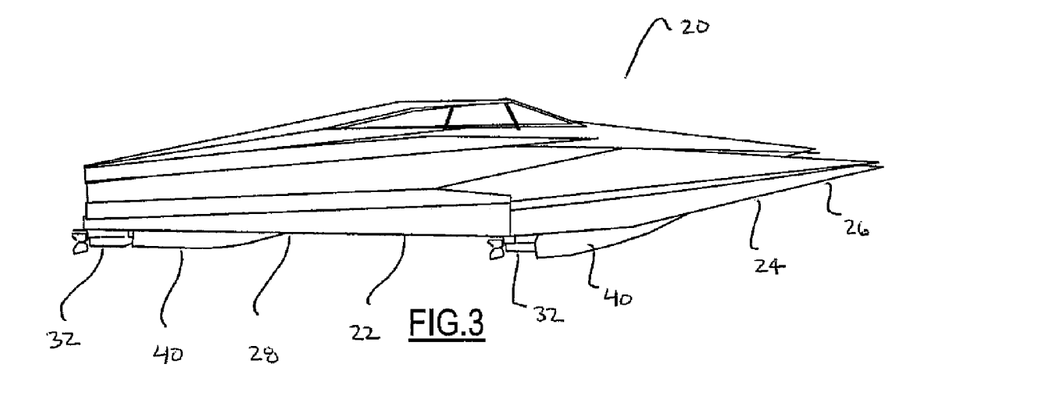
FIG. 3 is a side view of a high-speed boat hull with the steps in another position.

Referring to FIGS. 1, 2 and 3 there is shown a high-speed boat 20. The boat 20 includes a hull 22 having multiple sponsons 24. The hull 22 includes fore 26 and aft 28 portions. The sponsons 24 are separated by a forward hull portion 30. At least one propulsion unit 32 is disposed on one of the sponsons 24. In one aspect, propulsion units 32 may be disposed on each of the sponsons 24. The sponsons 24 may include a tunnel 34 formed therein. The tunnel 34 includes an open aft end 36 such that a propulsion unit 32 maybe fitted in the tunnel 34 and direct a thrust rearward to propel the boat hull 22 through the water. The propulsion unit 32 may be moved upward relative to the tunnel 34 to allow for shallow water operation of the propulsion unit 32 without impacting obstructions in the water.

The propulsion units 32 may also be disposed on the aft portion 28 of the boat hull 22, as shown in FIG. 1. Any combination of propulsion units 32 on the aft portion 28 and sponsons 24 may be used on the boat hull 22.

The propulsion units 32 may be moveable up and down relative to the hull 22 as described above.

The propulsion unit 32 may utilize an all-parallel shaft design similar to that of U.S. Pat. No. 6,902,448 which is herein incorporated by reference.

Figure 4:
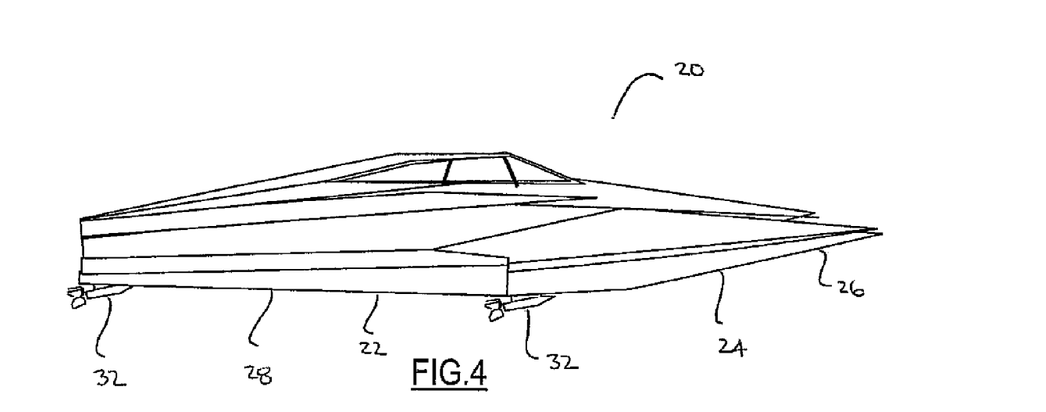
FIG. 4 is a side view of a high-speed boat hull with the drive units moved relative to the boat hull.

The propulsion unit 32 may be pivotable relative to the boat hull 22 to dynamically adjust a thrust vector of the propulsion unit 32 along the pitch (vertical) axis, as detailed in FIG. 4, also similar to that of U.S. Pat. No. 6,902,448.

The propulsion unit 32 may be both pivotable relative to the boat hull 22 to adjust a thrust vector of the propulsion unit 32 along the pitch (vertical) axis and simultaneously be steerable relative to the boat hull 22 to adjust a thrust vector of the propulsion unit 32 along the steer (horizontal) axis, similar to that of U.S. patent application Ser. No. 11/405,204 which is herein incorporated by reference.

The propulsion unit 32 may be moveable up and down relative to the hull 22 as described above, and pivotable relative to the boat hull 22 to adjust a thrust vector of the propulsion unit 32 along the pitch (vertical) axis, and simultaneously be steerable relative to the boat hull 22 to adjust a thrust vector of the propulsion unit 32 along the steer (horizontal) axis.

The high-speed boat 20 may be integrated with a vessel control system. The vessel control system electronics package is a fully distributed automation and control system, integrating an intelligent central control computer package with vessel motion sensors and servo hydraulic control outputs, although other suitable actuation mechanisms can be utilized, providing real-time automatic integrated control of a vessel's main operating parameters. The central control computer executes ride control algorithms and coordinates system activity. Sensors located throughout a vessel transmit real-time motion data (attitude, rate, acceleration, etc.) to the central control computer. Additional sensors monitor exact positioning and condition of the vessel's individual operating parameter directly influenced by the vessel control system. This information is processed and precise instructions are communicated to individual servo controllers responsible for specific vessel operating parameters or effectors. Based upon a vessel's specific design, parameters such as individual thrust vector angle, thrust velocity, engine output, drive engagement and gear selection, rudder position, dump vent air volume, skid fin adjustment, etc., are electronically monitored and controlled by the vessel control system and can be actuated hydraulically, electrically, or with other suitable mechanisms, similar to that of U.S. patent application Ser. No. 11/426,028 which is herein incorporated by reference.

Referring to FIGS. 1, 2 and 3, the high-speed boat 20 may also include at least one moveable step 40, attached to one of the sponsons 24, dynamically adjusting that sponson's relative contact position with respect to a water surface. The moveable step 40 may move up and down relative to the hull 22 as shown in FIG. 1 where the step 40 is raised and FIG. 3 where the step 40 is lowered. In one aspect, moveable steps 40 are attached to each of the sponsons 24. Additionally a moveable step 40 may be positioned on to the aft portion 28 of the hull 22. The moveable step 40 may be associated with a suspension system dynamically adjusting a ride of the hull 22. The suspension system may include hydraulic, pneumatic or mechanical dampening members linked with the step 40 and hull 22. The moveable step 40 has a shape minimizing drag in the water while allowing adjustment of the positioning of the sponson 24, as described above.

Figure 10:
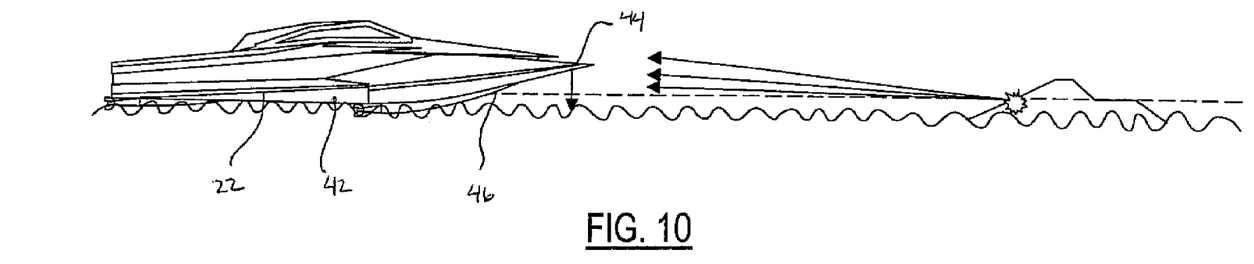
FIG. 10 is a side view of a high-speed boat hull showing the forward looking and downward looking sensors.

As with the propulsion units 32 described above, the moveable step(s) 40 may be linked with the control system. The control system moves the step(s) 40 automatically or per the instruction of an operator to adjust the position of the sponson(s) 24. The control system may be linked with sensors including pressure sensors 42, distance measuring sensors 44 detecting a distance between the hull and the water, and forward looking sensors 46 detecting a change in water condition in front of the hull, as best seen in FIG. 10. The forward looking sensor 46 may be designed to look ahead a distance to detect a change in the water such as an anomaly large swell in otherwise uniform water/wave conditions. The forward looking sensor 46 allows the control system or an operator to make dynamic adjustments to accommodate changes in water conditions ahead of the vessel. The pressure sensor 42 can be utilized to monitor an air pressure beneath the hull 22.

Figure 5:
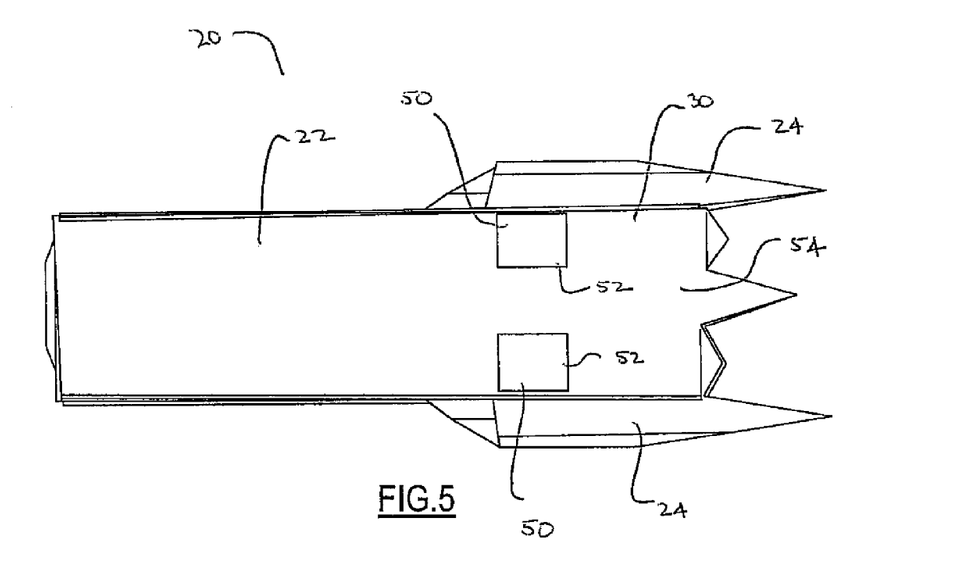
FIG. 5 is a bottom view of a high-speed boat hull including dump vents.
Figure 6:
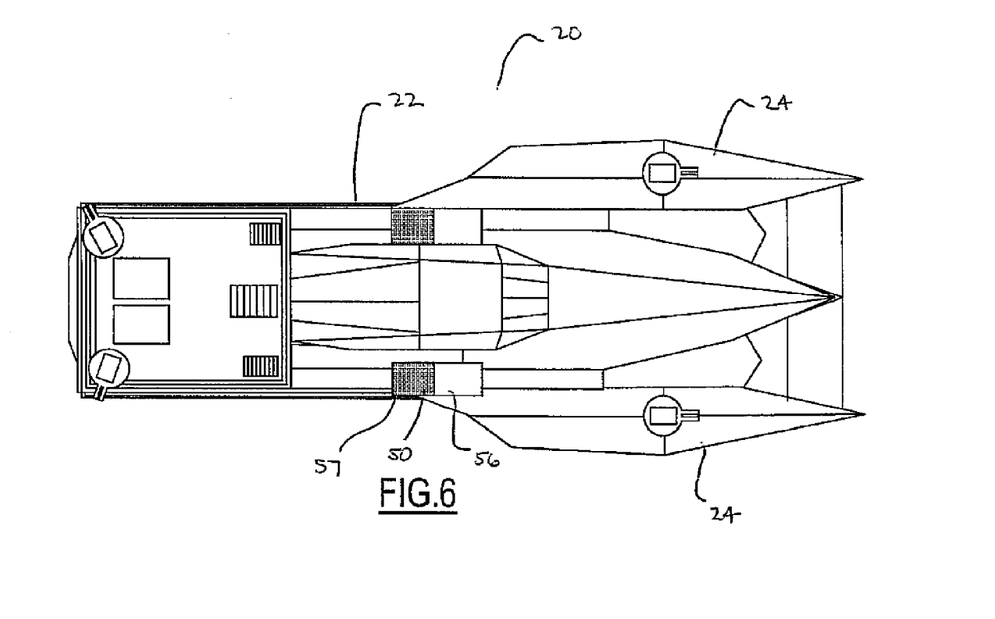
FIG. 6 is a top view of a high-speed boat hull including dump vents.
Figure 11:
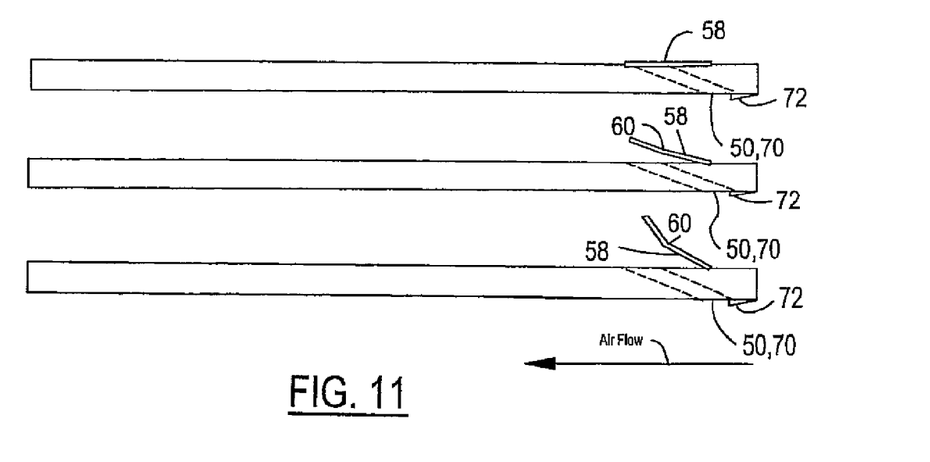
FIG. 11 is a side view of the foils of the dump and static vents in various positions.

Referring to FIGS. 5 and 6, the boat hull 22 may also include at least one dump vent 50 formed on the bottom surface 54 of the forward hull portion 30. A plurality of dump vents 50 may be used as shown in the figure. The dump vent 50 includes a door 52 that is moveable with respect to the dump vent 50 to control a volume of air released through the dump vent 50. The dump vent 50 extends from the bottom surface 54 to the top surface 56 of the forward hull portion 30. The top surface 56 of the dump vent 50 may include a screen 57 allowing passage of air. In another aspect, the top surface 56 may include a moveable foil 58, as shown in FIG. 11. The moveable foil 58 may be dynamically adjusted to exert a downward force on the front portion of the hull 22. The foil 58 may include a double hinge 60 design with a trailing edge having advancing angular movement with respect to the leading edge panel. The foil 58 creates a low-pressure area behind the foil 58 that draws high-pressure air out from under the hull 22 through the dump vent 50. The door 52 and foil 58 may be connected with the control system to automatically actuate or actuate upon the command of an operator. The sensors described above provide signals to alert the control system to actuate the various components associated with the dump vent 50.

Figure 7:
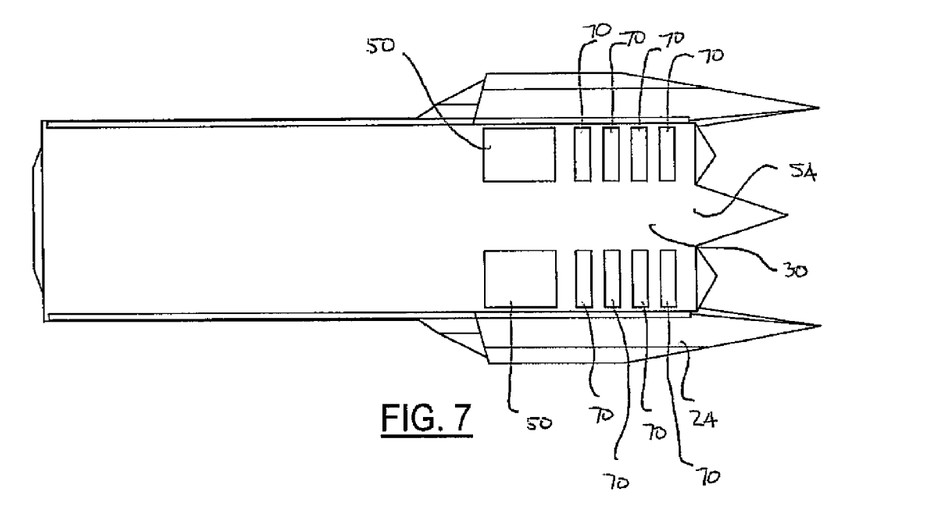
FIG. 7 is a bottom view of a high-speed boat hull including static vents.
Figure 8:
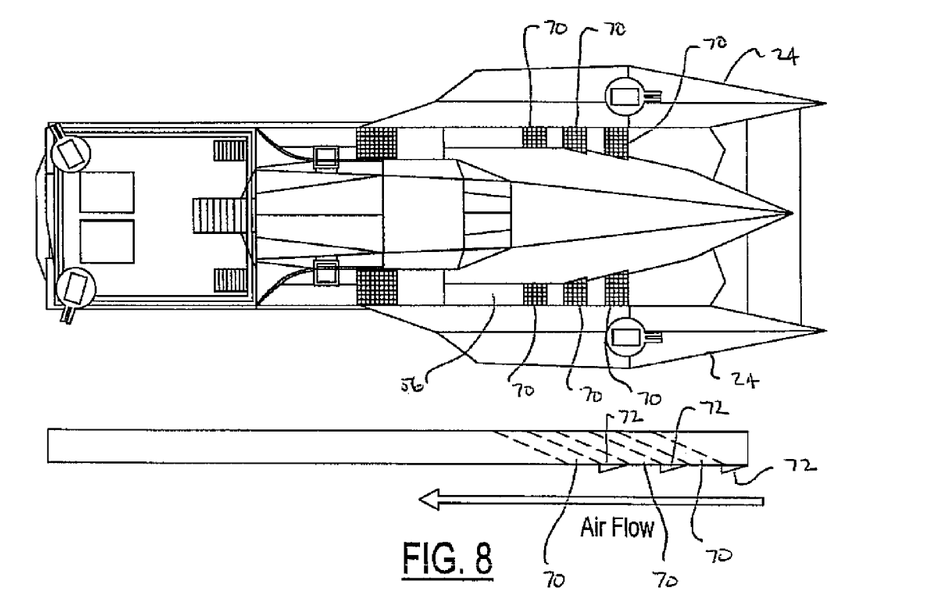
FIG. 8 is a top view of a high-speed boat hull including static vents in a low angle of attack.
Figure 9:
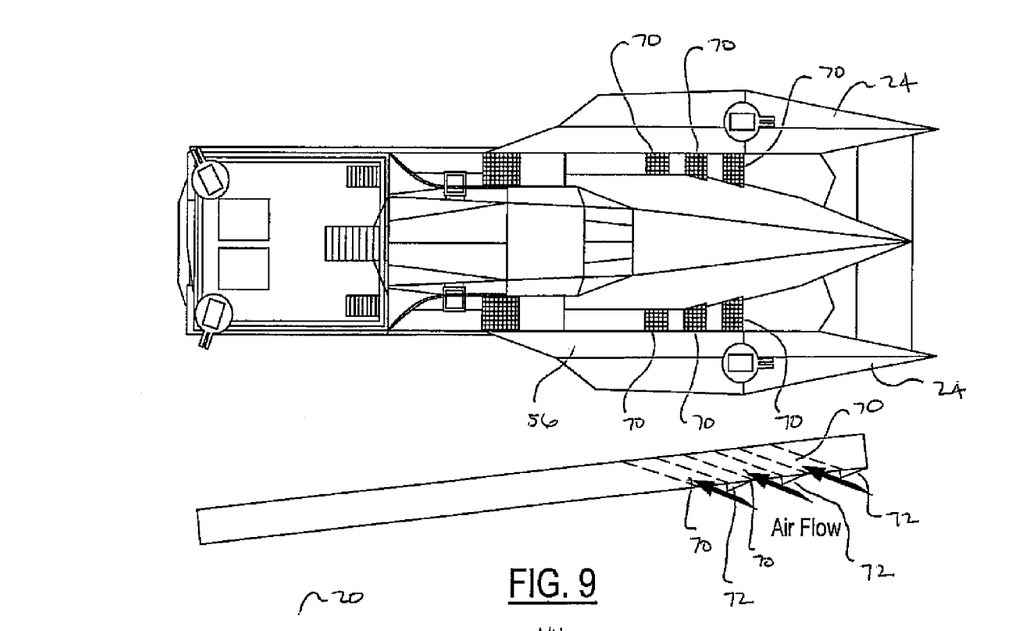
FIG. 9 is a top view of a high-speed boat hull including static vents in a high angle of attack.

Referring to FIGS. 7, 8 and 9 the boat hull 22 may also include at least one static vent 70 formed on the bottom surface 54 of the forward hull portion 30. The static vent 70 extends from the bottom surface 54 to the top surface 56 of the forward hull portion 30. A plurality of static vents 70 may be formed in the hull 22, as shown in the figures. The static vents 70 include a baffle 72 positioned in front of each vent. The baffles 72 selectively allow air flow through the static vent 70. The air flow is determined by an attitude of the hull 22. A low angle of attack of the hull, as shown in FIG. 8 limits the venting of air through the static vent 70, while a high angle of attack, as shown in FIG. 9, allows for the air beneath the hull to be automatically vented. As with the dump vent 50, the static vent 70 may include a screen 57 or foil 58 that maybe dynamically adjusted as described above.

Figure 12:
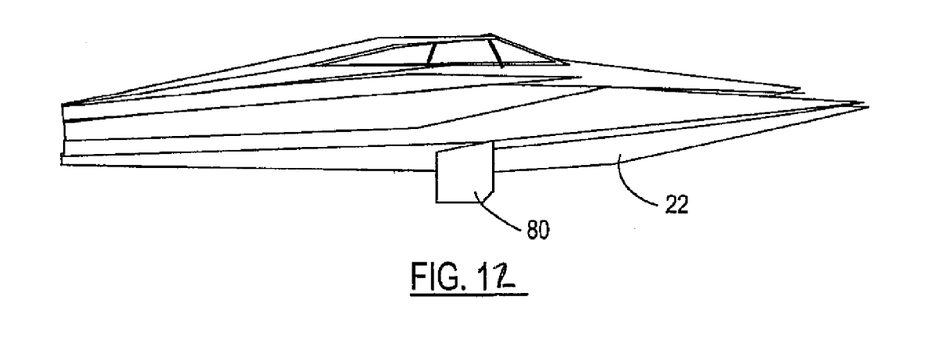
FIG. 12 is a side view of the boat with a skid fin lowered.
Figure 13:
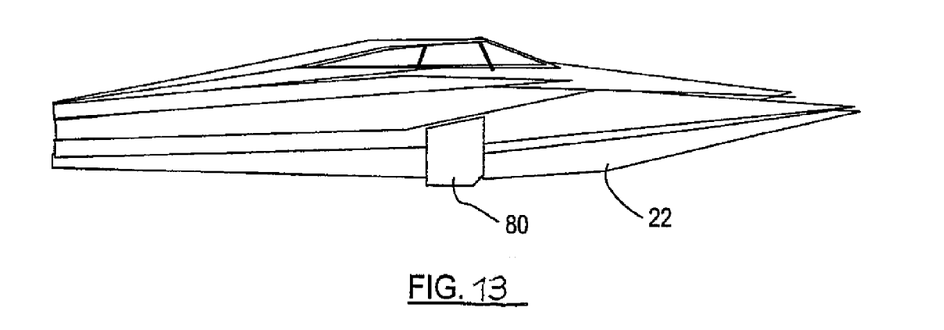
FIG. 13 is a side view of the boat with a skid fin retracted.
Figure 14:
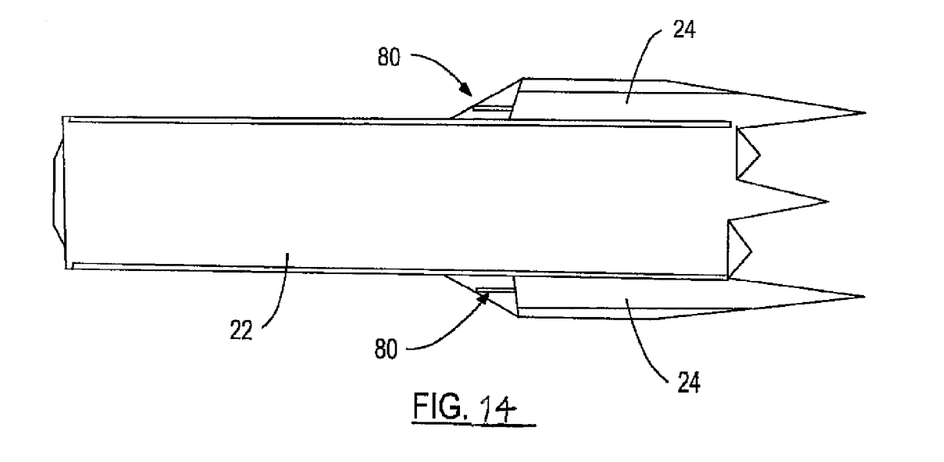
FIG. 14 is a bottom view of the boat showing the skid fins on both sides of the hull.

Referring to FIGS. 12, 13 and 14, the boat hull 22 may also include one or more adjustable skid fins 80 attached to one or more sponsons 24. Multiple adjustable skid fins 80 can be actuated independently or differentially to allow the boat to turn in either direction. For example, when the boat is turning left the left skid fin 80 will be moved downward while the right fin is retracted and vice versa when the boat is turning right. The depth of the skid fins 80 can be adjusted to accommodate various parameters such as the desired turning radius, speed and steering input, water conditions, etc. Additionally both skid fins 80 may be retracted when in shallow water or when the boat is navigating a straight course. The skid fins 80 may be connected to the described control system for automatic dynamic adjustment or can be adjusted based upon direct operator input.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A high speed boat comprising:
   a hull including at least two sponsons separated by a forward hull portion, the forward hull portion including a top surface and bottom surface;
   at least one adjustable dump vent formed on the bottom surface of the forward hull portion, the dump vent including a door moveable with respect to the dump vent for controlling a volume of air released through the dump vent, the dump vent extending from the bottom surface to the top surface of the forward hull portion; and
   a control system linked with the at least one dump vent door for adjusting a position of the moveable door.

2. The high speed boat hull of claim 1 wherein the top surface of the dump vent includes a screen allowing passage of air.

3. The high speed boat hull of claim 1 including a moveable foil portion attached to the top surface of the dump vent.

4. The high speed boat hull of claim 3 wherein the moveable foil may be adjusted to exert a downward force upon the hull.

5. The high speed boat hull of claim 1 wherein the control system is further linked to a moveable foil portion attached to the top surface of the dump vent.

6. The high speed boat hull of claim 5 wherein the control system is linked with at least one sensor positioned on the hull.

7. The high speed boat hull of claim 6 wherein the at least one sensor measures a distance between the hull and the water surface.

8. The high speed boat hull of claim 6 wherein the at least one sensor is forward looking detecting a change in water condition in front of the hull.

9. The high speed boat hull of claim 6 wherein the at least one sensor measures a pressure on the bottom portion of the hull.

* * * * *